(12) United States Patent
Iijima

(10) Patent No.: US 8,876,420 B2
(45) Date of Patent: Nov. 4, 2014

(54) IMAGE FORMING APPARATUS WITH OPENABLE INTERLOCKING GUIDE FLAPS

(75) Inventor: Shota Iijima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 181 days.

(21) Appl. No.: 13/433,248

(22) Filed: Mar. 28, 2012

(65) Prior Publication Data

US 2013/0084119 A1 Apr. 4, 2013

(30) Foreign Application Priority Data

Sep. 30, 2011 (JP) ................. 2011-218020

(51) Int. Cl.
| | |
|---|---|
| B41J 13/10 | (2006.01) |
| B41J 29/02 | (2006.01) |
| B41J 11/00 | (2006.01) |
| B65H 85/00 | (2006.01) |
| H04N 1/00 | (2006.01) |
| B65H 29/58 | (2006.01) |
| G03G 15/00 | (2006.01) |
| B41J 3/60 | (2006.01) |

(52) U.S. Cl.
CPC ............ B65H 85/00 (2013.01); B65H 2801/06 (2013.01); B41J 3/60 (2013.01); B41J 11/006 (2013.01); B65H 2402/46 (2013.01); B41J 13/10 (2013.01); H04N 1/00 (2013.01); B65H 29/58 (2013.01); B65H 2601/11 (2013.01); G03G 15/6552 (2013.01); B65H 2404/611 (2013.01)
USPC ........... 400/642; 400/188; 400/624; 400/691; 400/693; 347/104

(58) Field of Classification Search
CPC .................. G03G 21/1633; G03G 2221/1675; G03G 21/1638; G03G 2215/00544; B41J 11/18; B41J 13/009; B41J 13/106; B65H 2402/441; B65H 2405/324
USPC ............ 400/691, 693, 642; 271/273; 399/124
See application file for complete search history.

(56) References Cited

U.S. PATENT DOCUMENTS

| | | | |
|---|---|---|---|
| 6,332,611 B1 * | 12/2001 | Tomita | ........................ 271/273 |
| 2002/0135821 A1 | 9/2002 | Sekine | |
| 2006/0280530 A1 * | 12/2006 | Andoh | ......................... 399/301 |

(Continued)

FOREIGN PATENT DOCUMENTS

| | | | | |
|---|---|---|---|---|
| JP | 2002-348052 A | 12/2002 | | |
| JP | 2006064727 A | * | 3/2006 | ............ B65H 85/00 |

(Continued)

Primary Examiner — Daniel J. Colilla
(74) Attorney, Agent, or Firm — Baker Botts L.L.P.

(57) ABSTRACT

There is provided an image recording apparatus including: a first transporting portion with a first transporting path formed to guide a sheet with its recording surface facing upward, a recording portion, a transporting roller, a second transporting portion with a second transporting path, a first flap, a sandwiching member sandwich the sheet between itself and the first flap, and a second flap. The first flap turn between a first position being able to guide the sheet along the first transporting path and a second position spaced downward from the sandwiching member farther than in the first position, and the second flap change between a third position for a third surface to define a guide surface of the second transporting path and a fourth position to open up the second transporting path.

6 Claims, 10 Drawing Sheets

(56) References Cited

U.S. PATENT DOCUMENTS

| | | |
|---|---|---|
| 2008/0296834 A1 | 12/2008 | Matsubara et al. |
| 2010/0098473 A1* | 4/2010 | Hosoi .................... 399/400 |
| 2011/0310207 A1* | 12/2011 | Ito et al. ................ 347/104 |
| 2013/0083146 A1* | 4/2013 | Iijima .................... 347/104 |

FOREIGN PATENT DOCUMENTS

| | | |
|---|---|---|
| JP | 2007-070004 A | 3/2007 |
| JP | 2008-297085 A | 12/2008 |
| JP | 2009-232192 A | 10/2009 |
| JP | 2010-083601 A | 4/2010 |

\* cited by examiner

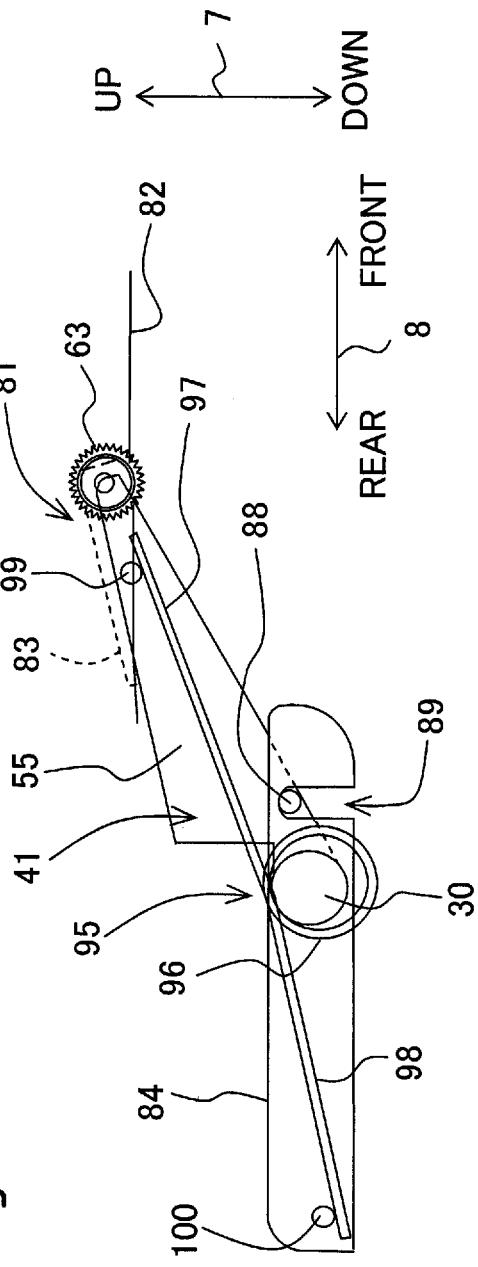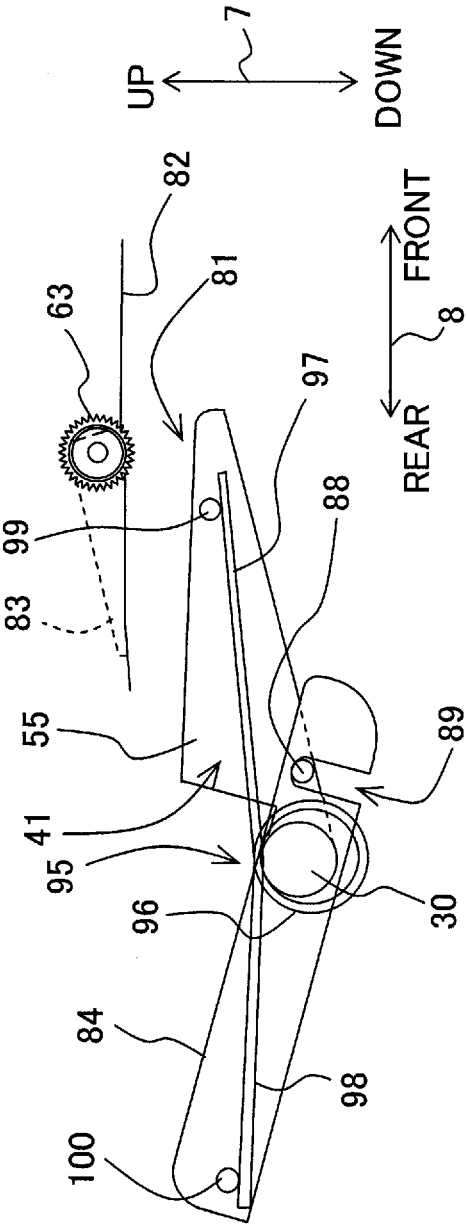

IMAGE FORMING APPARATUS WITH OPENABLE INTERLOCKING GUIDE FLAPS

CROSS REFERENCE TO RELATED APPLICATION

The present application claims priority from Japanese Patent Application No. 2011-218020, filed on Sep. 30, 2011, the disclosure of which is incorporated herein by reference in its entirety.

BACKGROUND OF THE INVENTION

1. Field of the Invention

The present invention relates to image recording apparatuses which records images on a sheet and, in particular, to an image recording apparatus which is configured to record images on both sides of a sheet.

2. Description of the Related Art

In many cases, image recording apparatuses configured to record images on paper sheets are provided with a paper sheet transporting path inside. Further, those image recording apparatuses are provided with a recording portion which records images on paper sheets in the transporting path. Further, the image recording apparatuses transport a paper sheet along the transporting path in accord with a transporting direction by sandwiching the paper sheet between pairs of rollers. As an example, there are two pairs of the previously mentioned rollers as below. One is a pair of transporting rollers provided on the upstream side relative to the recording portion in accord with the transporting direction to guide the paper sheet to the recording portion, while the other is a pair of paper discharge rollers provided on the downstream side relative to the recording portion in accord with the transporting direction to discharge the paper sheet out of the apparatus with images recorded by the recording portion.

However, after image recording by the recording portion, the paper sheet sometimes floats upward in a recurvate fashion from a supporting portion which is supporting the paper sheet. Therefore, some image recording apparatuses are provided with a float-up prevention mechanism which is configured to prevent the paper sheet from floating upward. This float-up prevention mechanism is provided in the vicinity of the recording portion on the downstream side relative to the recording portion in accord with the transporting direction, i.e. between the recording portion and the pair of paper discharge rollers. As the float-up prevention mechanism, for example, a pair of rollers can serve to prevent the paper sheet from floating upward by sandwiching the paper sheet between the rollers. Further, as another example of the float-up prevention mechanism, a spur member can be arranged above the transporting path to prevent the paper sheet from floating upward by holding down the paper sheet from above.

Further, there are image recording apparatuses known to be capable of recording images on both sides of a paper sheet. In such image recording apparatuses, a resupply transporting path is formed in addition to a main transporting path for transporting paper sheets from the tray accommodating the paper sheets to the discharge port through the recording portion for recording images on paper sheets. For example, the resupply transporting path serves the purpose for the pair of paper discharge rollers to send the paper sheets transported to the downstream side of the recording portion in accord with the transporting direction with images recorded on the surfaces by the recording portion, back again to the upstream side of the recording portion in accord with the transporting direction in the main transporting path. The paper sheets transported through the resupply transporting path reach the recording portion with their back surfaces facing the recording portion. By virtue of this, the recording portion can record images on the back surfaces of the paper sheets.

With such image recording apparatus, if a paper sheet is jammed in the transporting path as its front edge has passed through the recording portion, then a user is able to remove the jammed paper sheet from the apparatus by pulling at the jammed paper caught between the pair of paper discharge rollers.

However, because the pair of paper discharge rollers are in contact with each other to let paper sheets come between the two rollers, when the front edge of a paper sheet has not reached the pair of paper discharge rollers, then the user is unable to reach or access the paper sheet from the front side of the apparatus through the pair of paper discharge rollers. Further, even though the front edge of the paper sheet has reached the pair of paper discharge rollers, when the paper sheet is pulled at forcibly, then there is a risk of tearing it apart and leave behind scraps of the torn paper inside the apparatus. Therefore, for the same reason as described hereinabove, it is impossible or difficult to gain access to the paper scraps from the front side of the apparatus through the pair of paper discharge rollers.

SUMMARY OF THE INVENTION

Accordingly, the present teaching is configured to solve the above problem, and an object thereof is to provide an image recording apparatus capable of easily taking out paper sheets jammed inside.

According to an aspect of the present teaching, there is provided an image recording apparatus which records an image on a sheet, the apparatus including:

a recording portion which is provided in a first transporting path of guiding the sheet in a transporting direction, and which is configured to record the image on the sheet guided through the first transporting path;

a transporting roller which is disposed at the downstream side from the recording portion in the transporting direction to transport the sheet;

a first flap which has a first surface and a second surface, the first surface being configured to define a guide surface of the first transporting path between the recording portion and the transporting roller, and the second surface being configured to define a guide surface of a second transporting path which is another transporting path of guiding the paper sheet and is connected with the first transporting path between the recording portion and the transporting roller and the upstream side relative to the recording portion in the transporting direction;

a sandwiching member which is arranged in the first transporting path, and which is configured to sandwich the sheet between the sandwiching member and the first flap; and a second flap which has a third surface opposite the second surface of the first flap which is configured to define a guide surface of the second transporting path, wherein the first flap is configured to turn, between a first position and a second position, about a pivot located on the upstream side relative to the position of sandwiching the sheet between the first flap and the sandwiching member, the second flap is configured to change between a third position and a fourth position, the first position is a position in which the sheet is guided along the first transporting path by sandwiching the sheet between the first flap and the sandwiching member, the second position is a position in which the first surface is spaced from the sandwiching member farther than in the first position, the third position is a position in which the third surface defines the guide surface of the second transporting path, and the fourth position is a position at which the second transporting path is opened.

According to the above configuration, the second flap can change its position to the fourth position. If the second flap changes its position to the fourth position, then the second transporting path is opened. By virtue of this, a user is able to gain access to as far as the first transporting path from the second transporting path. As a result, the user is able to capture any sheet jammed in the first transporting path or in the second transporting path.

However, when the first flap and the sandwiching member sandwich some sheet captured by the user in the above manner, if the user pulls at the paper sheet forcibly, then there is a risk of tearing the sheet. Therefore, according to the above configuration, the first surface of the first flap is revolvable to assume the second position spaced from the sandwiching member. By virtue of this, even if the user pulls at the sheet forcibly, it is possible to reduce the possibility of tearing the sheet.

BRIEF DESCRIPTION OF THE DRAWINGS

FIG. 10A is a longitudinal sectional view schematically showing the first flap 41 and a turning member 84, wherein the turning member 84 is shown in a state of assuming a seventh position and the first flap 41 in a state of assuming the tenth position; and FIG. 10B is another longitudinal sectional view schematically showing the first flap 41 and the turning member 84, wherein the turning member 84 is shown in a state of assuming a eighth position and the first flap 41 in a state of assuming the second position.

DESCRIPTION OF THE PREFERRED EMBODIMENT

Figure 1:
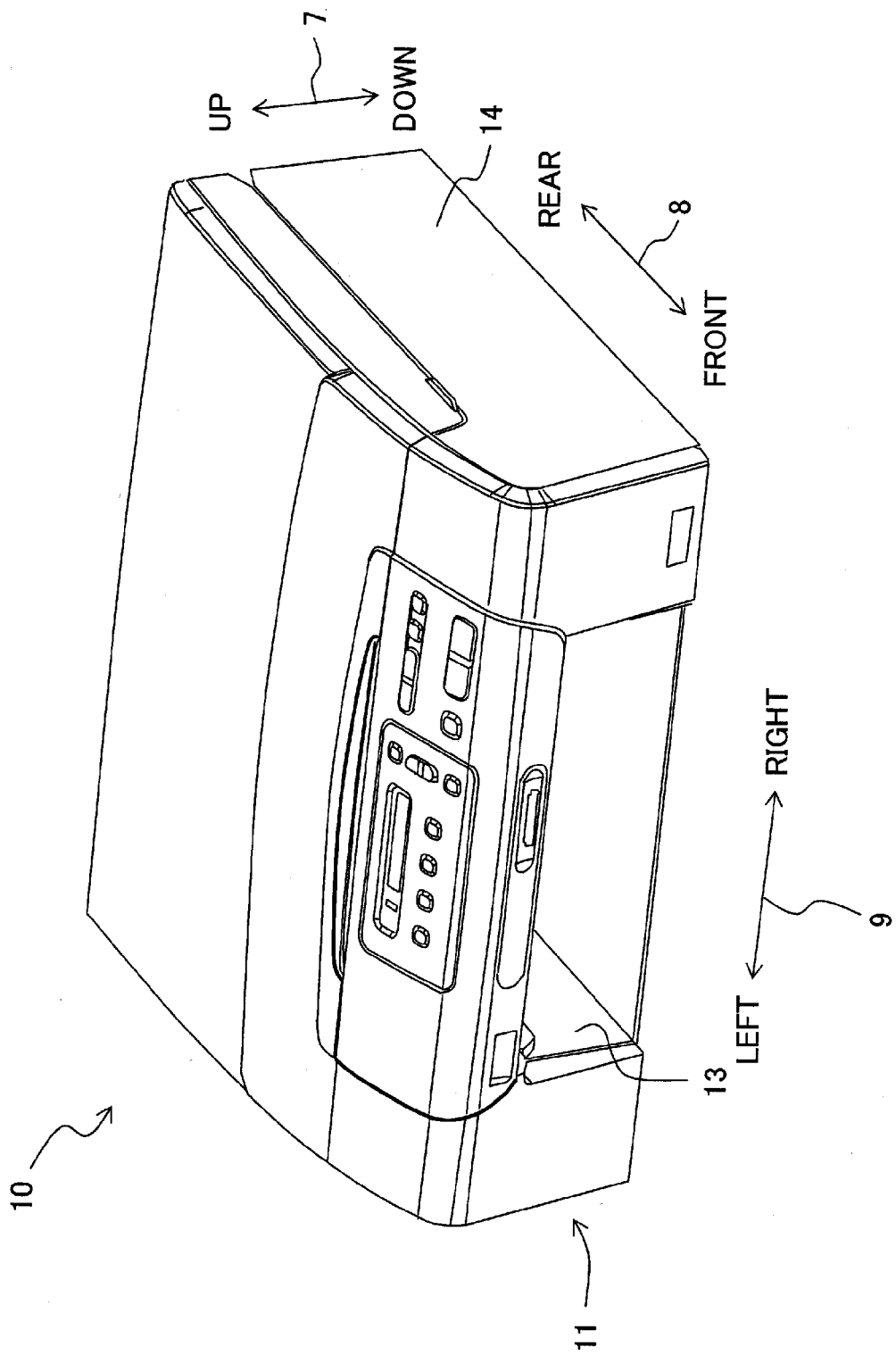
FIG. 1 is an external perspective view of a multifunction printer 10.

Hereinbelow, an embodiment in accordance with the present teaching will be explained. Further, the embodiment explained below is merely an example of the present teaching, and it is needless to say that the embodiment of the present teaching can be modified as appropriate as long as the modifications are within the true spirit and scope of the present teaching. Further, in the following explanations, a vertical or up-down direction 7 is defined on the basis of a state in which the multifunction printer 10 is placed to be utilizable (a state shown in FIG. 1); a depth or front-rear direction 8 is defined as an opening 13 is provided on the near side (the front side); and a horizontal or left-right direction 9 is defined as the multifunction printer 10 is viewed from the near side (the front side).

<Multifunction Printer 10>

As shown in FIG. 1, the shape of the multifunction printer 10 is almost a low-profile cuboid. The multifunction printer 10 has a variety of functions such as a facsimile function, a print function, and the like. As the print function, it has a both-side image recording function for recording images on both sides of a sheet of recording paper. Further, it is arbitrary whether or not to have other functions than the print function. Further, the multifunction printer 10 is provided with a printer portion 11 in the lower portion for recording images on recording paper (see FIG. 2;). The printer portion 11 has a cabinet (housing, chassis) 14 with the opening 13 formed on the front side, and a paper feed tray 20 which is capable of accommodating recording paper of various sizes (see FIG. 2), and can be inserted into and removed from the opening 13 in the front-rear direction 8.

Figure 2:
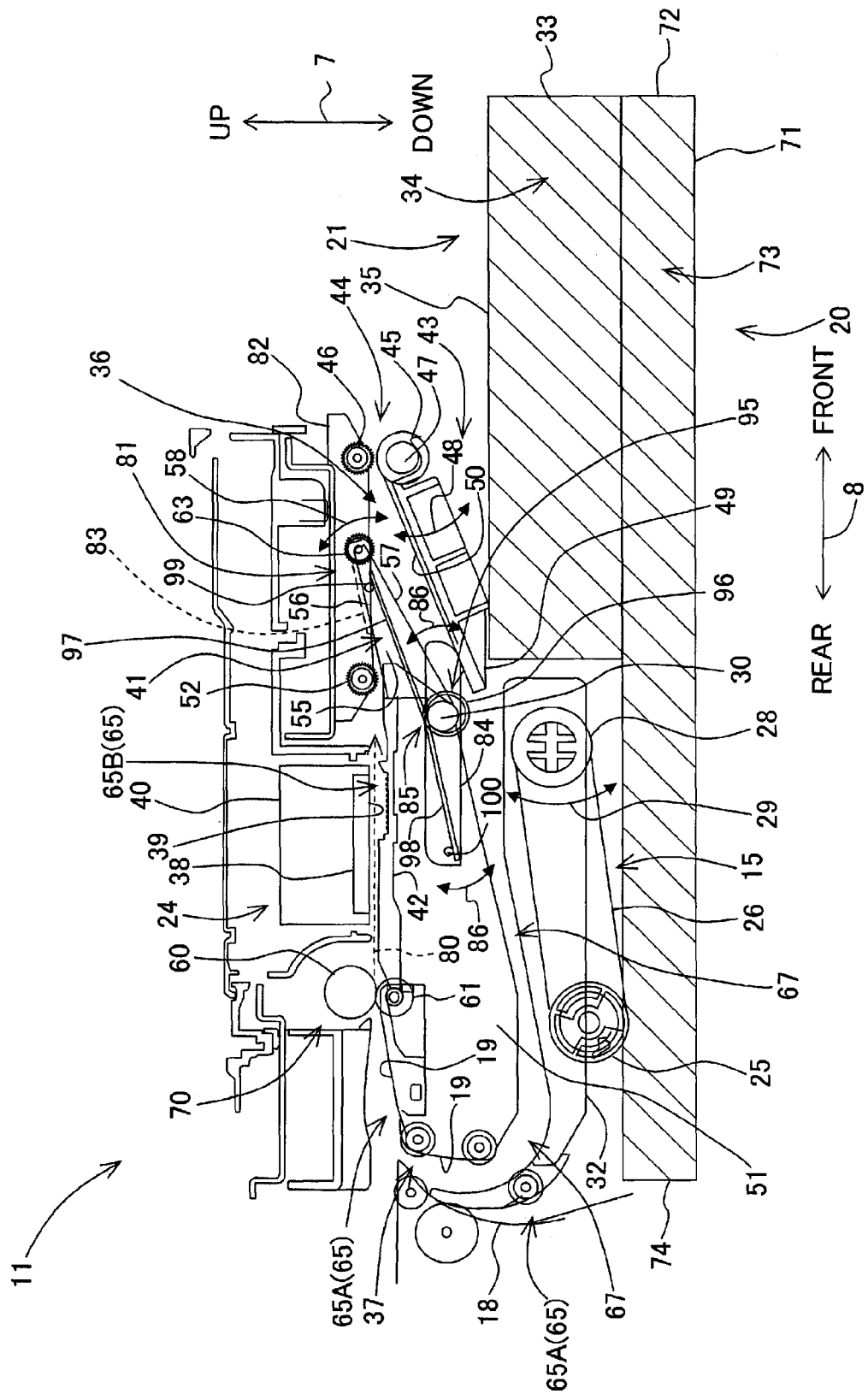
FIG. 2 is a longitudinal sectional view schematically showing an internal structure of a printer portion 11, wherein a first flap 41 is shown in a state of assuming an tenth position.

As shown in FIG. 2, the printer portion 11 includes the paper feed tray 20, a paper feed portion 15 which picks up the recording paper from the paper feed tray 20 to feed the recording paper, a recording portion 24 of an ink jet recording type provided above the paper feed tray 20 to record images on recording paper by jetting ink drops to the recording paper fed by the paper feed portion 15, a first flap 41, a second flap 43, and the like. Further, the recording portion 24 is not limited to the ink jet type, but can adopt various recording types such as an electrophotographic method and the like.

<Paper Feed Tray 20>

As shown in FIG. 1, it is possible to insert into and remove from the opening 13, in the front-rear direction 8, the paper feed tray 20 capable of accommodating the recording paper 12 of various sizes (see FIG. 2). Further, FIG. 1 omits illustration of the paper feed tray 20.

As shown in FIG. 2, the paper feed tray 20 is arranged below the aftermentioned recording portion 24 in a state of being installed in the printer portion 11. The paper feed tray 20 accommodates the recording paper 12 of a desired size such as size A4, size B5, or the like. The paper feed tray 20 is formed into almost a plate-shaped rectangle elongated in the insertion and removal direction (the front-rear direction 8 in the embodiment) in a planar view. In detail, the paper feed tray 20 includes a loading plate 71 for loading the recording paper 12, a front plate 72 provided to stand upward along the left-right direction 9 (perpendicular to the paper plane of FIG. 2) on the front end of the loading plate 71, a side plate 73 provided to stand upward along the front-rear direction 8 on both the left and right ends of the loading plate 71, and a rear plate 74 provided to stand obliquely upward and rearward along the left-right direction 9 on the rear end of the loading plate 71.

The paper feed tray 20 includes a paper discharge tray 21 fixed to superpose the upper side of the paper feed tray 20 on the front side ahead of the central portion of the paper feed tray 20 in the front-rear direction 8. The paper discharge tray 21 includes a front plate 33 in continuous connection with the front plate 72 of the paper feed tray 20, a side plate 34 in continuous connection with the side plate 73 of the paper feed tray 20, and a top plate 35 in connection with the upper ends of the front plate 33 and side plate 34.

As the paper feed tray 20 is installed in the printer portion 11, that is, as the paper feed tray 20 is located in a fifth position shown in FIG. 2, it is possible to feed the recording paper loaded on the loading plate 71 of the paper feed tray 20 to an aftermentioned transporting path 65 from the rear side of the paper feed tray 20. The recording paper 12 fed to the transporting path 65 from the paper feed tray 20 is discharged onto the top plate 35 of the paper discharge tray 21 after the recording portion 24 has recorded images on the recording paper. That is, it is possible to place the discharged recording paper on the top plate 35 of the paper discharge tray 21.

Figure 4:
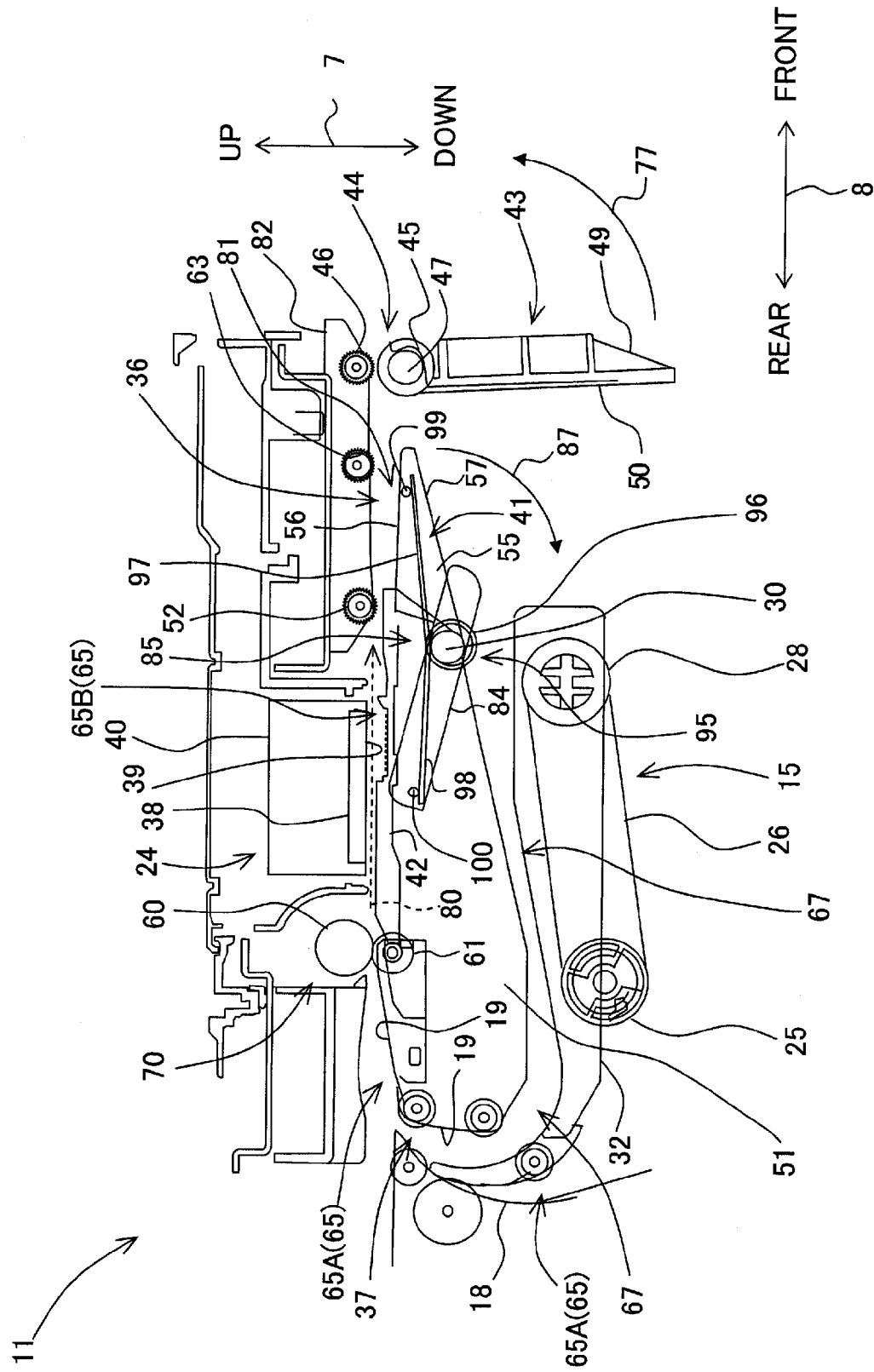
FIG. 4 is still another longitudinal sectional view schematically showing the internal structure of the printer portion 11, wherein the first flap 41 is shown in a state of assuming a second position.
Figure 5:
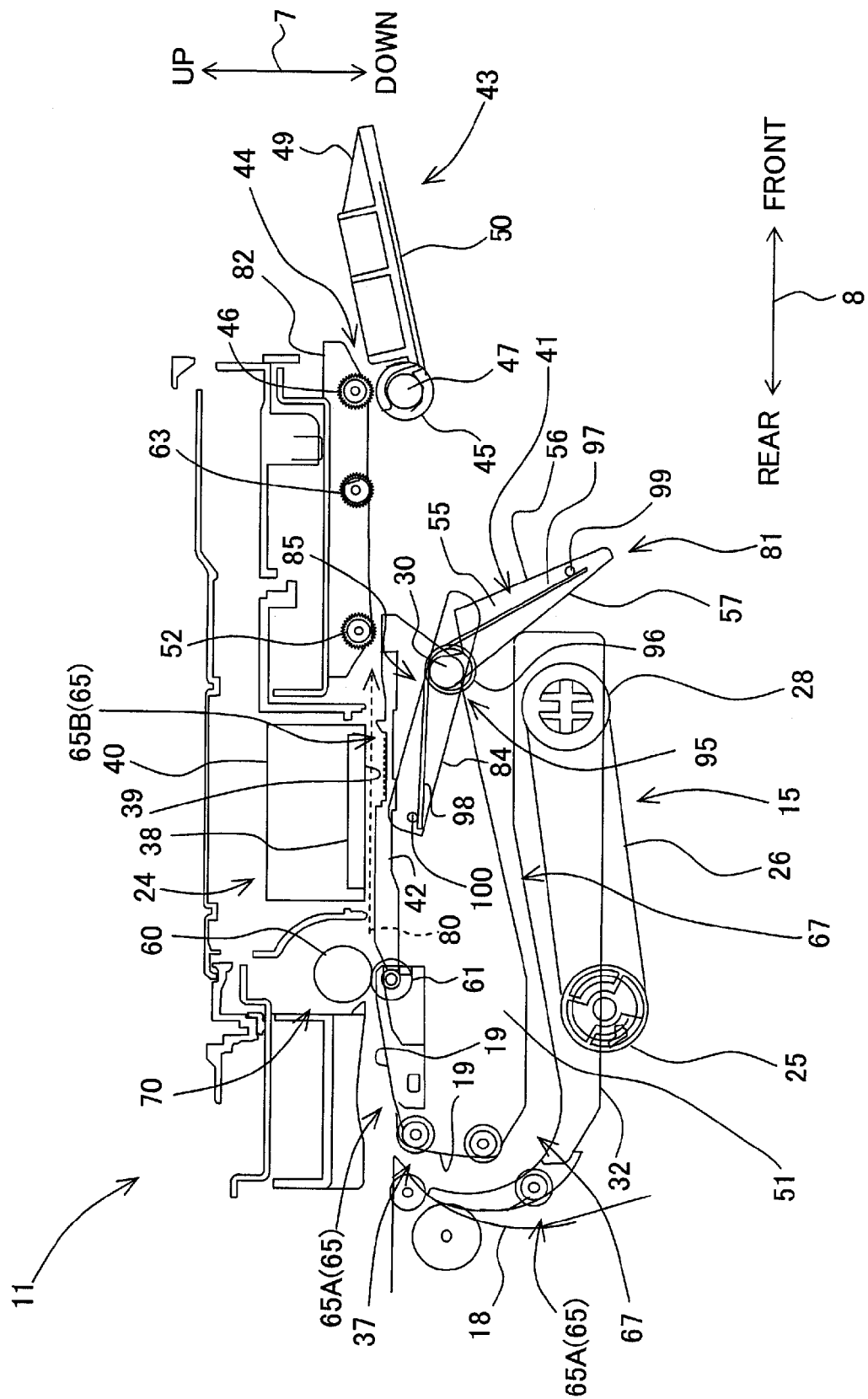
FIG. 5 is still another longitudinal sectional view schematically showing the internal structure of the printer portion 11, wherein the first flap 41 is shown in a state of assuming a ninth position.

On the other hand, as the paper feed tray 20 is located in a sixth position different from the fifth position, that is, as the paper feed tray 20 is removed from the printer portion 11 in the embodiment, the printer portion 11 is in states as shown in FIGS. 4 and 5. In the above manner, the paper feed tray 20 is movable between the fifth position and the sixth position along the front-rear direction 8.

<Paper Feed Portion 15>

As shown in FIG. 2, the paper feed portion 15 is provided above the paper feed tray 20, and includes a paper feed roller 25, a paper feed arm 26, and a driving force transmission mechanism (not shown). The paper feed roller 25 is pivotally supported at the front end of the paper feed arm 26. The paper feed arm 26 moves rotationally or turns about a rotating axis 28 in the directions of arrows 29. By virtue of this, the paper feed roller 25 is able to reach and leave the loading plate 71 of the paper feed tray 20. The paper feed roller 25 is rotated through transmission of the driving force of a paper feed motor (not shown) via the driving force transmission mechanism provided inside the paper feed arm 26 and in meshing engagement with a plurality of gears. The paper feed roller 25 separates the recording paper loaded on the loading plate 71 of the paper feed tray 20 sheet by sheet, and supplies the separated recording paper to a curved path 65A of the transporting path 65 which will be explained hereinbelow.

<Transporting Path 65>

As shown in FIG. 2, inside the printer portion 11, the transporting path 65 (an example of the first transporting path of the present teaching) is formed from the far end (the end on the rear side) of the paper feed tray 20 to the paper discharge tray 21 through the recording portion 24. The transporting path 65 is divided into the curved path 65A and a straight path 65B.

The curved path 65A is a curved passage provided to extend from near the upper end of the rear plate 74 of the paper feed tray 20 up to a pair of transporting rollers 70. The curved path 65A is formed into almost an arc shape around the inner side of the printer portion 11. The recording paper fed from the paper feed tray 20 is transported along the curved path 65A and guided toward the pair of transporting rollers 70. The curved path 65A is defined by an outer guide member 18 and a rear surface 19 of an afterementioned module body 51 facing each other at a predetermined interval.

The straight path 65B is a linear passage provided to extend from the pair of transporting rollers 70 to the paper discharge tray 21. The straight path 65B is formed by the recording portion 24 and a platen 42 facing each other at a predetermined interval where the recording portion 24 is provided. The recording portion 24 is arranged above the straight path 65B, while the platen 42 is arranged below the straight path 65B. Further, the straight path 65B is defined by an upper guide member 82 and the module body 51 facing each other at a predetermined interval where the recording portion 24 is not provided.

The upper guide member 82 is provided above the straight path 65B. Further, as shown in FIG. 2 with a dashed line, a plurality of recesses 83 are formed in the left-right direction 9 in the lower surface of the upper guide member 82, that is, the surface facing the straight path 65B. The recesses 83 are provided to face the first flap 41. Further, as will be described hereinafter, the first flap 41 moves rotationally or turns, and tip portion 81 of the turning first flap 41 are inserted into the recesses 83. Here, the tip portion 81 are the turning apexes of the first flap 41 and their vicinity. FIG. 2 shows a state of the tip portion 81 of the first flap 41 inserted in the recesses 83.

The recording paper is guided in accord with a first transporting direction 80 through the straight path 65B from the rear side toward the front side (the orientation shown in FIG. 2 with a dashed arrow). When the recording paper guided through the straight path 65B is supported by the platen 42 from below, the upper surface of the recording paper faces the recording portion 24. On the upper surface of the recording paper, an image is recorded by the recording portion 24. That is, the straight path 65B guides the recording paper with its recording surface facing upward in accord with the first transporting direction 80.

<Module Body 51 and Platen 42>

As shown in FIG. 2, the module body 51 is arranged inside the printer portion 11 between the recording portion 24 and the paper feed portion 15 in the up-down direction 7. The module body 51 is supported at both ends in the left-right direction 9 by a frame (not shown) of the multifunction printer 10. The platen 42, a pinch roller 61, the first flap 41, and the like are fixed on the module body 51.

The platen 42 is a member formed into almost a thin-plate shape fixed on the upper surface of the module body 51 from above in the central portion of the module body 51 in the front-rear direction 8. The recording paper guided through the straight path 65B is supported on the upper surface of the platen 42. The pinch roller 61, which will be described hereinafter, is fixed on the module body 51 on the rear side of the platen 42. The first flap 41, which will also be described hereinafter, is fixed on the module body 51 on the front side of the platen 42.

<Recording Portion 24>

As shown in FIG. 2, the recording portion 24 is provided above the straight path 65B to face the platen 42, and includes a carriage 40 for carrying a recording head 38 to reciprocate in the left-right direction 9 (perpendicular to the paper plane of FIG. 2). The recording head 38 is supplied with ink from an ink cartridge (not shown). The recording head 38 jets ink in minute ink drops from nozzles 39 provided in the lower surface of the recording head 38. With the carriage 40 reciprocating in the left-right direction 9, the recording head 38 scans the recording paper. Further, at the time, the nozzles 39 of the recording head 38 jet droplets of the ink. By virtue of this, an image is recorded on the upper surface of the recording paper, that is, an image is recorded on the recording surface of the recording paper supported on the platen 42 and guided through the straight path 65B.

<Pair of Transporting Rollers 70>

As shown in FIG. 2, the pair of transporting rollers 70 composed of a first transporting roller 60 and the pinch roller 61 are provided on the upstream side relative to the recording portion 24 in accord with the first transporting direction 80. The first transporting roller 60 is pivotally supported to be rotatable at both ends in the left-right direction 9 by the frame (not shown) of the multifunction printer 10. The pinch roller 61 is arranged below the first transporting roller 60, and the both ends of the transporting roller 60 in the left-right direction 9 are supported to be rotatable by the module body 51. The pinch roller 61 is pressed against the first transporting roller 60 by an elastic member such as a spring or the like (not shown).

The first transporting roller 60 rotates positively or negatively as a driving force of positive or negative rotation direction is transmitted to the transporting roller 60 from a transporting motor (not shown). For example, when the transporting motor transmits a driving force of positive direction, then the first transporting roller 60 rotates in the direction to transport the recording paper in accord with the first transporting direction 80. Further, when the transporting motor transmits a driving force of negative direction, then the first transporting roller 60 rotates in the direction to transport the recording paper opposite to the first transporting direction 80. That is, the pair of transporting rollers 70 receive therebetween the recording paper sent in through the curved path 65A, and transport the recording paper onto the platen 42 by virtue of the driving force of positive direction transmitted from the transporting motor.

<First Spur 52>

As shown in FIG. 2, a first spur 52 is provided on the downstream side relative to the recording portion 24 in accord with the first transporting direction 80. The first spur 52 is supported to be rotatable at both ends in the left-right direction 9 by the upper guide member 82. The first spur 52 comes to contact with the upper surface of the recording paper from above.

<Pair of Discharge Rollers 44>

A pair of discharge rollers 44 composed of a second transporting roller 45 and a second spur 46 are provided on the downstream side relative to the recording portion 24 in accord with the first transporting direction 80, i.e. to be exact, the downstream side relative to the first spur 52 in accord with the first transporting direction 80. The second spur 46 is arranged above the second transporting roller 45, and pressed against the surface of the second transporting roller 45 by an elastic member such as a spring or the like (not shown).

The second transporting roller 45 rotates positively or negatively as a driving force of positive or negative rotation direction is transmitted thereto from the aforementioned transporting motor. For example, when a single-side recording is carried out, then the second transporting roller 45 rotates positively. By virtue of this, the recording paper is received by the pair of discharge rollers 44 therebetween, transported in accord with the first transporting direction 80, and discharged onto the paper discharge tray 21. On the other hand, when a both-side recording (double-side recording) is carried out, then the second transporting roller 45 can change its rotation direction from positive to negative with the recording paper held between the pair of discharge rollers 44 in the rear end in accord with the first transporting direction 80. By virtue of this, coming out from between the pair of discharge rollers 44, the recording paper is transported opposite to the first transporting direction 80, guided by an aforementioned second surface 57 of the first flap 41, and transported toward a reverse transporting path 67 which will be explained hereinbelow.

<Reverse Transporting Path 67>

As shown in FIG. 2, the reverse transporting path 67 (an example of the second transporting path of the present teaching) is connected with the transporting path 65 at a connecting position 36, and at a connecting position 37. Here, the connecting position 36 is located in the transporting path 65 between the first spur 52 and the second transporting roller 45. Further, the connecting position 37 is located in the transporting path 65 on the upstream side relative to the pair of transporting rollers 70 in accord with the first transporting direction 80, that is, the upstream side relative to the recording portion 24 in accord with the first transporting direction 80.

The reverse transporting path 67 extends below the platen 42 but above the paper feed portion 15, that is, on the other side to the recording portion 24 across the straight path 65B. The upper side of reverse transporting path 67 is defined by the lower surface of the module body 51. Further, the lower side of the reverse transporting path 67 is defined by the second flap 43 and a lower guide member 32.

Transported by the pair of discharge rollers 44 opposite to the first transporting direction 80, the recording paper is transported through the reverse transporting path 67 from the connecting position 36 toward the connecting position 37.

<First Flap 41>

Figure 3:
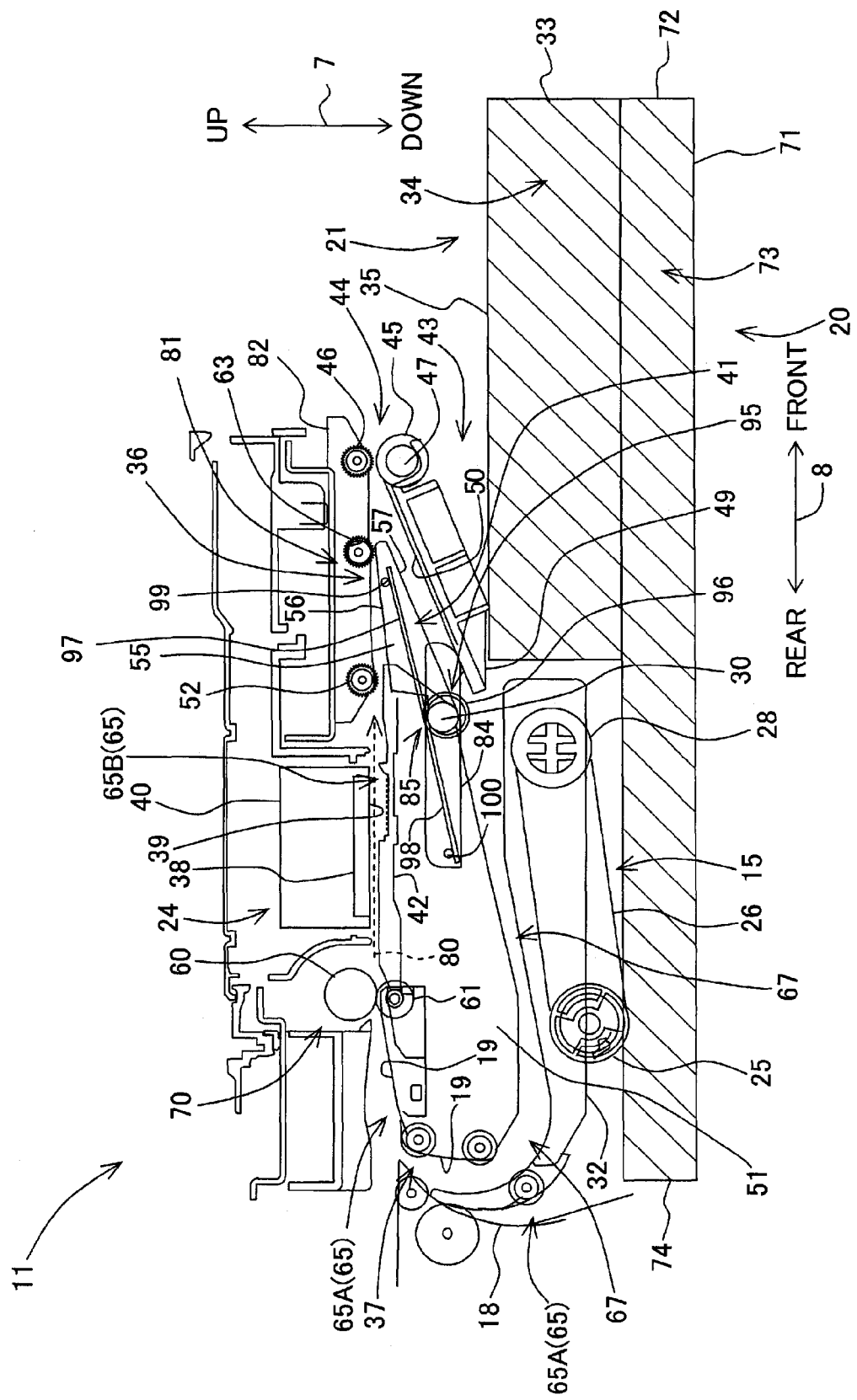
FIG. 3 is another longitudinal sectional view schematically showing the internal structure of the printer portion 11, wherein the first flap 41 is shown in a state of assuming a first position.

As shown in FIG. 3, the first flap 41 is fixed on the module body 51 and arranged below the straight path 65B in the connecting position 36. The first flap 41 is provided below the upper guide member 82 to face the upper guide member 82 in the up-down direction 7.

As shown in FIGS. 2 and 3, the first flap 41 includes a pivot 30 extending in the left-right direction 9, and a plurality of ribs 55 fixed to project from the main body 54 to the front side. Here, the projected apexes of the plurality of ribs 55 correspond to the aforementioned tip portions 81 of the first flap 41.

The both ends of the pivot 30 in the left-right direction 9 are supported to be rotatable by the module body 51. By virtue of this, the first flap 41 is rotatable in the directions of arrows 58 (see FIG. 2) about the pivot 30 of the left-right direction 9 which is the same direction as that of the rotating axis of the second transporting roller 45.

As will be described hereinafter, the recording paper can be received between the tip portions 81 of the first flap 41 and a third spur 63. Thereby, the pivot 30 of the first flap 41 is located on the upstream side relative to the position of sandwiching the recording paper with the third spur 63 in accord with the first transporting direction 80.

The plurality of ribs 55 are formed at a predetermined interval along the left-right direction 9, respectively. The upper surfaces of the respective ribs 55 face the straight path 65B from below to support the recording paper transported through the straight path 65B. By virtue of this, the upper surfaces 56 of the respective ribs 55 can constitute the lower guide surface of the straight path 65B as a first surface 56 which is the upper surface of the first flap 41. Further, lower surfaces 57 of the respective ribs 55 face the reverse transporting path 67 from above. By virtue of this, the lower surfaces 57 of the respective ribs 55 can constitute the upper guide surface of the reverse transporting path 67 as a second surface 57 which is the lower surface of the first flap 41.

<Third Spur 63>

As shown in FIG. 2, the third spur 63 (corresponding to a spur roller which is an example of the sandwiching member of the present teaching) is provided above the straight path 65B, and supported to be rotatable by the upper guide member 82.

As will be described hereinafter, the third spur 63 receives the recording paper between itself and the tip portions 81 of the first flap 41 as the first flap 41 is posed in a state of assuming a first position (the state shown in FIG. 3).

Further, the third spur 63 is provided in between the ribs 55 of the first flap 41 in the left-right direction 9. In other words, the third spur 63 does not face the ribs 55 of the first flap 41.

<Second Flap 43>

As shown in FIG. 2, the second flap 43 extends out along the same direction as the reverse transporting path 67 from the underside of the connecting position 36. The second flap 43 is a member formed into almost a flat-plate shape of an approximate low profile with a shorter dimension in the up-down direction 7 than dimensions in the front-rear direction 8 and the left-right direction 9. An upper surface 50 of the second flap 43 (an example of the third surface of the present teaching) faces the reverse transporting path 67 from below. By virtue of this, the upper surface 50 of the second flap 43 can constitute the lower guide surface of the reverse transporting path 67.

In the embodiment, as will be described in detail hereinbelow, the second flap 43 is fixed on a rotating shaft 47 of the second transporting roller 45 at its front end to be rotatable about the rotating shaft 47 in directions of arrows 48. Further, in the embodiment, although the second flap 43 is on the same pivot with the second transporting roller 45, it may as well adopt a different pivot.

As shown in FIG. 2, when the paper feed tray 20 is located in the fifth position, a lower surface 49 of the second flap 43 is supported by the top plate 35 of the paper discharge tray 21 fixed on the paper feed tray 20. That is, when the paper feed tray 20 is located in the fifth position, the top plate 35 of the paper discharge tray 21 supports the second flap 43 from below to maintain a third position. In the third position, the upper surface 50 of the second flap 43 constitutes, as described hereinbefore, the lower guide surface of the reverse transporting path 67.

As shown in FIG. 4, when the paper feed tray 20 is removed from the multifunction printer 10, that is, when the paper feed tray 20 moves from the fifth position to the sixth position, then the lower surface 49 of the second flap 43 is no longer supported by the top plate 35 of the paper discharge tray 21. By virtue of this, the second flap 43 turns downward under its own weight. As a result, the second flap 43 is located to assume a fourth position shown in FIG. 4. That is, when the paper feed tray 20 is located in the sixth position, the top plate 35 of the paper discharge tray 21 can change the position of the second flap 43 to the fourth position. Further, when the paper feed tray 20 is located in the sixth position, the second flap 43 in the fourth position is in a revolvable state. Thereby, as the second flap 43 is turned in the direction of arrow 77 (see FIG. 4), the reverse transporting path 67 is opened up (see FIG. 5).

On the other hand, when the paper feed tray 20 is inserted into the multifunction printer 10, that is, when the paper feed tray 20 moves from the sixth position to the fifth position, then the lower surface 49 of the second flap 43 is pressed on the paper discharge tray 21. By virtue of this, the second flap 43 turns upward and, as a result, changes its position to the third position shown in FIG. 3.

<Interlock Portion 85>

The printer portion 11 is provided with an interlock portion 85. In the embodiment, as shown in FIG. 2, the interlock portion 85 includes a turning member 84 supported by the second flap 43 and a coil spring 95. Further, the turning operation of the first flap 41 due to the interlock portion 85 will be described hereinafter. The turning member 84 and the coil spring 95 are fixed on the module body 51 to turn in directions of arrows 86 about the same pivot with the first flap 41, that is, about the pivot 30. Further, the interlock portion 85 is provided out of the range of transporting the recording paper in the reverse transporting path 67 in the left-right direction 9.

The turning member 84 projects to both the front and rear sides from the pivot 30. In particular, the pivot 30 is formed a little ahead of the center of the turning member 84 in the front-rear direction 8. As shown in FIG. 2, the turning member 84 is supported on the front side ahead of the pivot 30 by the upper surface 50 of the second flap 43 in the third position. Further, as shown in FIG. 2, a second stopper 100 is fixed on the rear side of the turning member 84 behind the pivot 30.

In the embodiment, a torsion spring is utilized as the coil spring 95 which is constructed by a coil portion 96, a first arm 97, and a second arm 98.

The coil portion 96 is fixed on the pivot 30 of the first flap 41. Biased upward, the apex of the first arm 97 is pressed on a first stopper 99 projecting from the first flap 41. Also biased upward, the apex of the second arm 98 is pressed on the aforementioned second stopper 100. In the above manner, the coil spring 95 biases the first flap 41 upward.

The biasing force of the coil spring 95 is smaller than the weight of the recording paper. By virtue of this, when the first surface 56 of the first flap 41 supports the recording paper transported through the straight path 65B, then under the weight of the recording paper, the first flap 41 is turned from an tenth position (the position shown in FIG. 2) which will be explained hereinbelow, to the first position (the position shown in FIG. 3).

Further, in the embodiment, although the coil spring 95 is utilized to bias the first flap 41, other biasing members such as plate springs and the like may as well be utilized instead of the coil spring 95 when the purpose is to bias the first flap 41 upward.

In the embodiment, as shown in FIG. 10A, a projection 88 is formed on the first flap 41 to project leftward from the side surface of the first flap 41. Further, a notch 89 is formed in the turning member 84. As will be described hereinafter, with the projection 88 in contact with the notch 89, the first flap 41 is restrained from turning, thereby keeping a predetermined position.

<Turning of the First Flap 41>

The first flap 41 turns between the first position shown in FIG. 3, the tenth position shown in FIG. 2, a second position shown in FIG. 4, and a ninth position shown in FIG. 5.

First, the states shown in FIGS. 2 and 3 will be explained. In FIG. 2, the first flap 41 is in the tenth position, the second flap 43 is in the third position, and the turning member 84 is in a seventh position as will be described hereinafter. In FIG. 3, the first flap 41 is in the first position, the second flap 43 is in the third position, and the turning member 84 is in the seventh position.

As shown in FIGS. 2 and 10A, in the embodiment, biased by the coil spring 95 as described hereinbefore, the first flap 41 is commonly positioned to assume the tenth position. When the first flap 41 is in the tenth position, the tip portions 81 of the first flap 41 are inserted into the recesses 83, thereby blocking the straight path 65B. At the time, because the projection 88 is in contact with the notch 89, or because the tip portions 81 are in contact with the surface defining the recesses 83 of the upper guide member 82, the first flap 41 is not revolvable upward beyond the tenth position.

As shown in FIG. 3, when the recording paper transported through the straight path 65B comes to be supported by the first surface 56 of the first flap 41, in resisting the biasing force of the coil spring 95 under the weight of the recording paper, the first flap 41 is turned downward from the tenth position, thereby changing its position to the first position. At the time, the recording paper is received between the first flap 41 and the third spur 63 at the tip portions 81 of the first flap 41, and transported through the straight path 65B. After the recording paper passes through the first surface 56 of the first flap 41, biased by the coil spring 95, the first flap 41 resumes the tenth position (see FIG. 2).

In the states shown in FIGS. 2 and 3, the turning member 84 is supported by the upper surface 50 of the second flap 43 in the third position. The position of the turning member 84 at this time is an example of the seventh position of the present teaching. Hereinafter, the position of the turning member 84 shown in FIGS. 2 and 3 will be referred to as the seventh position. That is, supported by the upper surface 50 of the second flap 43 in the third position, the turning member 84 is maintained in the seventh position. Further, when the turning member 84 assumes the seventh position, as described hereinbefore, the first flap 41 is maintained in the tenth position (see FIG. 2) and the first position (see FIG. 3).

Next, the state shown in FIG. 4 will be explained. In FIG. 4, the first flap 41 is in the second position, the second flap 43 is in the fourth position, and the turning member 84 is in a eighth position as will be described hereinafter.

With the paper feed tray 20 moved from the fifth position to the sixth position, when the second flap 43 is turned from the third position (see FIG. 3) to the fourth position (see FIG. 4), then the turning member 84 is no longer supported by the second flap 43. By virtue of this, the turning member 84 comes apart from the second flap 43, and turns about the pivot 30. In detail, a front portion, of the second flap 43, that is located front side of the pivot 30 turns downward with its, and a rear portion, of the second flap 43, that is located rear side of the pivot 30 turns upward. As a result, the turning member 84 turns, i.e. changes its position, from the seventh position shown in FIG. 3 to the eighth position shown in FIG. 4.

At this time, as shown in FIG. 10B, with the projection 88 pressed by the turning member 84, the first flap 41 follows the turning of the turning member 84, and turns downward. That is, the first flap 41 turns from the first position (see FIG. 3) to the second position (see FIG. 4). That is, the turning member 84 in the eighth position changes the position of the first flap 41 from the first position to the second position.

Here, as shown in FIGS. 3 and 4, the first flap 41 in the second position is positioned below the first flap 41 in the first position. Further, as shown in FIG. 4, the first surface 56 of the first flap 41 in the second position lies below and apart from the third spur 63.

In the above manner, the interlock portion 85 (the turning member 84 and the coil spring 95) follows the postural change of the second flap 43 from the third position to the fourth position to turn the first flap 41 from the first position to the second position.

Next, the state shown in FIG. 5 will be explained. In FIG. 5, the first flap 41 is in the ninth position, the second flap 43 is in the third position, and the turning member 84 is in the eighth position.

In the state shown in FIG. 4, as described hereinabove, a user of the multifunction printer 10 can turn the second flap 43 in the direction of arrow 77. Further, in resisting the biasing force of the coil spring 95, the user of the multifunction printer 10 can turn the first flap 41 in the direction of arrow 87. In the above manner, the first flap 41 is, as shown in FIG. 5, positioned to assume the ninth position apart from the third spur 63 farther than the second position.

Further, when the user of the multifunction printer 10 releases the first flap 41, then the first flap 41 turns from the ninth position biased by the coil spring 95 (see FIG. 5) to the second position (see FIG. 4). That is, in the embodiment, the coil spring 95 turns the first flap 41 to resume the second position after it was turned in the direction of arrow 87, i.e. from the second position to the ninth position. That is, the coil spring 95 is an example of the further biasing member of the present teaching.

Further, in the embodiment, the coil spring 95 is also an example of the particular biasing member of the present teaching. However, the particular biasing member and the further biasing member of the present teaching may as well be biasing members (coil springs, for example) different from each other. In particular, it is also preferable to provide a coil spring for biasing the first flap 41 from the second position toward the first position and another coil spring for biasing the first flap 41 from the ninth position toward the second position, respectively.

On the other hand, with the paper feed tray 20 moved from the sixth position to the fifth position, when the second flap 43 is turned from the fourth position (see FIG. 4) to the third position (see FIG. 3), then the upper surface 50 of the second flap 43 presses the turning member 84 on the front side ahead of the pivot 30. By virtue of this, the turning member 84 turns about the pivot 30 upward with its front side ahead of the pivot 30, and downward with its rear side behind the pivot 30. As a result, due to the biasing force of the coil spring 95, the first flap 41 follows the turning member 84 to turn upward. That is, the first flap 41 turns from the second position shown in FIG. 4 to the first position shown in FIG. 3. In the above manner, the interlock portion 85 follows the postural change of the second flap 43 from the fourth position to the third position to turn the first flap 41 from the second position to the first position.

Effects of the Embodiment

According to the embodiment, the second flap 43 is movable to assume the fourth position. When the second flap 43 is moved to assume the fourth position, the reverse transporting path 67 is opened up. By virtue of this, the user is able to gain access to as far as the straight path 65B from the reverse transporting path 67 via the connecting position 36. As a result, the user can capture any recording paper jammed in the transporting path 65 and the reverse transporting path 67.

When some recording paper captured by the user in the above manner is sandwiched between the first flap 41 and the third spur 63, if the user pulls at the recording paper forcibly, then there is a risk of tearing the recording paper. According to the embodiment, however, the first surface 56 of the first flap 41 is revolvable to resume the second position spaced farther below the lower end of the third spur 63. By virtue of this, even if the user pulls at the recording paper, it is possible to reduce the possibility of tearing the recording paper.

In the above manner, according to the embodiment, the first flap 41 is revolvable to assume the second position, and the second flap 43 is revolvable to assume the fourth position. Thereby, it is possible to easily take out the recording paper jammed inside the apparatus.

Further, according to the embodiment, only by moving the paper feed tray 20 from the sixth position to the fifth position, it is possible to move the second flap 43 to assume the third position, thereby turning the first flap 41 to assume the first position.

Further, according to the embodiment, only by moving the paper feed tray 20 from the fifth position to the sixth position, it is possible to move the second flap 43 to assume the fourth position, thereby turning the first flap 41 to assume the second position.

Further, according to the embodiment, the coil spring 95 biases the first flap 41 toward the first position side. Therefore, even though the user holds and turns the first flap 41 to the second position in order to take out the jammed recording paper, the first flap 41 resumes the first position when released. That is, according to the embodiment, even if the first flap 41 is turned and once falls into a state unable to guide the recording paper, it is still possible to automatically return the first flap 41 to the state able to guide the recording paper.

Further, according to the embodiment, with the first flap 41 turned to the ninth position, it is possible to expose the second surface 57 more than when the first flap 41 is positioned to assume the second position. As a result, it becomes easier for the user to gain access to the second surface 57.

Further, according to the embodiment, because the coil spring 95 biases the first flap 41 from the ninth position toward the second position, it is possible to turn the first flap 41 in conjunction with the postural change of the second flap 43.

In the embodiment, when the second transporting roller 45 changes its rotation direction while the recording paper is transported by the second transporting roller 45 through the transporting path 65 with its rear end passing through the first position of the first flap 41 and third spur 63, then the relevant sheet may be mistakenly sent backward through the transporting path 65 though it should be guided into the reverse transporting path 67.

However, in the embodiment, the first flap 41 is revolvable to assume the tenth position to block up the transporting path 65. By virtue of this, it is possible to prevent the recording paper from being mistakenly sent back to the transporting path 65.

Modified Embodiment

In the above embodiment, although the printer portion 11 is provided with the interlock portion 85 constructed by the turning member 84 and the coil spring 95, the interlock portion 85 may as well be not provided. In particular, as shown in FIGS. 6 to 9, the turning member 84 may as well be not provided. Further, the coil spring 95 shown in FIGS. 6 to 9 is provided in the modification only to bias the first flap 41 upward.

Figure 6:
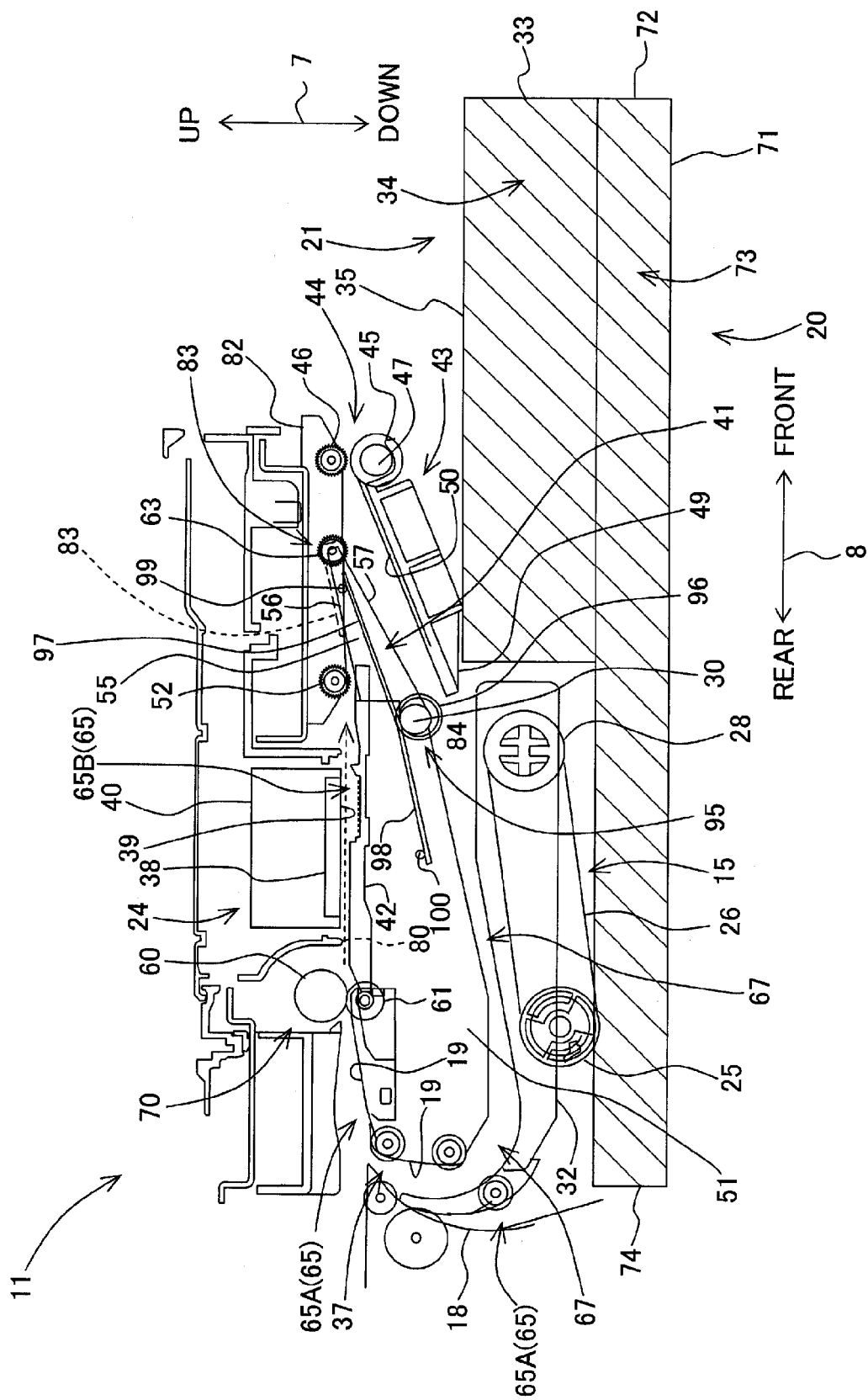
FIG. 6 is a longitudinal sectional view schematically showing an internal structure of the printer portion 11 in accordance with a modification, wherein a paper feed tray 20 is installed in the multifunction printer 10, and the first flap 41 is shown in a state of assuming the tenth position.
Figure 7:
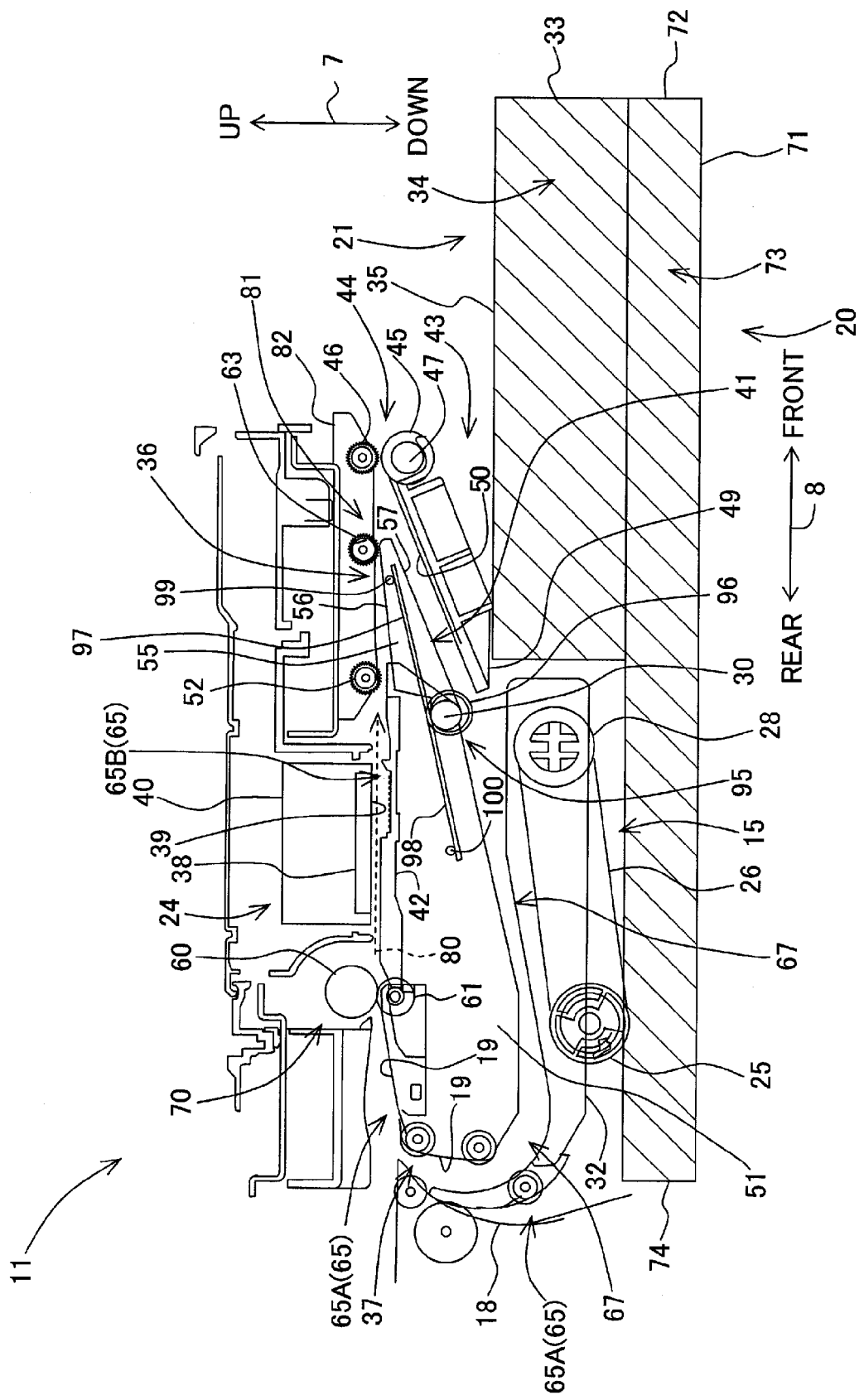
FIG. 7 is another longitudinal sectional view schematically showing the internal structure of the printer portion 11 in accordance with the modification, wherein the first flap 41 is shown in a state of assuming the first position.

The modification is identical in the following aspects to the above embodiment. As shown in FIG. 6, biased by the coil spring 95, the first flap 41 assumes the tenth position. That is, FIG. 6 in accordance with the modification corresponds to FIG. 2 in accordance with the aforementioned embodiment. Further, when the recording paper comes to be supported by the upper surface of the first flap 41, then as shown in FIG. 7, the first flap 41 is turned under the weight of the recording paper from the tenth position to the first position. That is, FIG. 7 in accordance with the modified embodiment corresponds to FIG. 3 in accordance with the embodiment.

However, the modified embodiment is different in the following aspects from the aforementioned embodiment. That is, in the modified embodiment, as shown in FIG. 8, with the paper feed tray 20 moved to the sixth position, even though the second flap 43 is turned to the fourth position, the first flap 41, biased by the coil spring 95, still maintains the tenth position (not supporting the recording paper; see FIG. 8), or the first position (supporting the recording paper).

Figure 8:
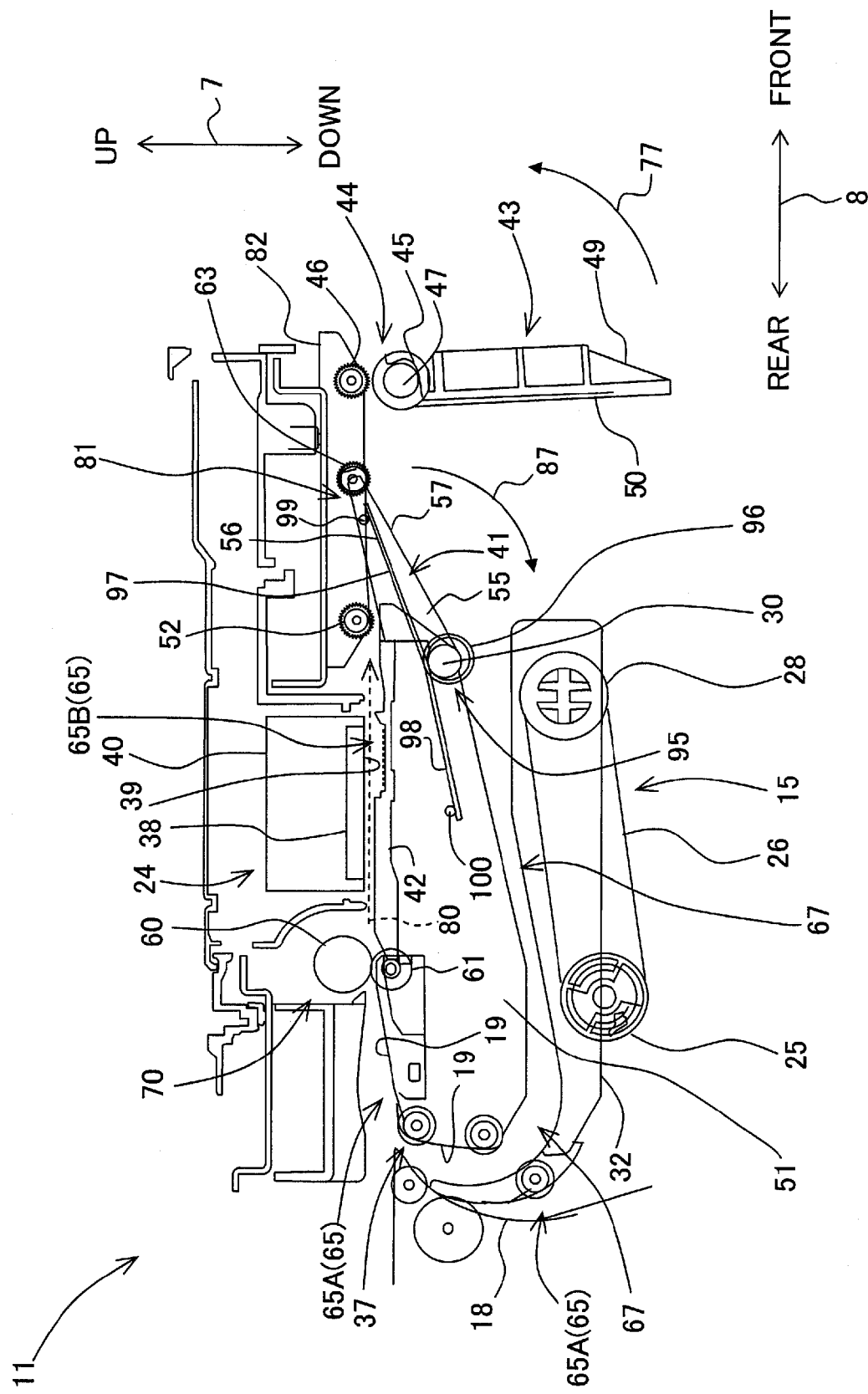
FIG. 8 is still another longitudinal sectional view schematically showing the internal structure of the printer portion 11 in accordance with the modification, wherein the paper feed tray 20 is removed from the multifunction printer 10, and the first flap 41 is shown in a state of assuming the tenth position.
Figure 9:
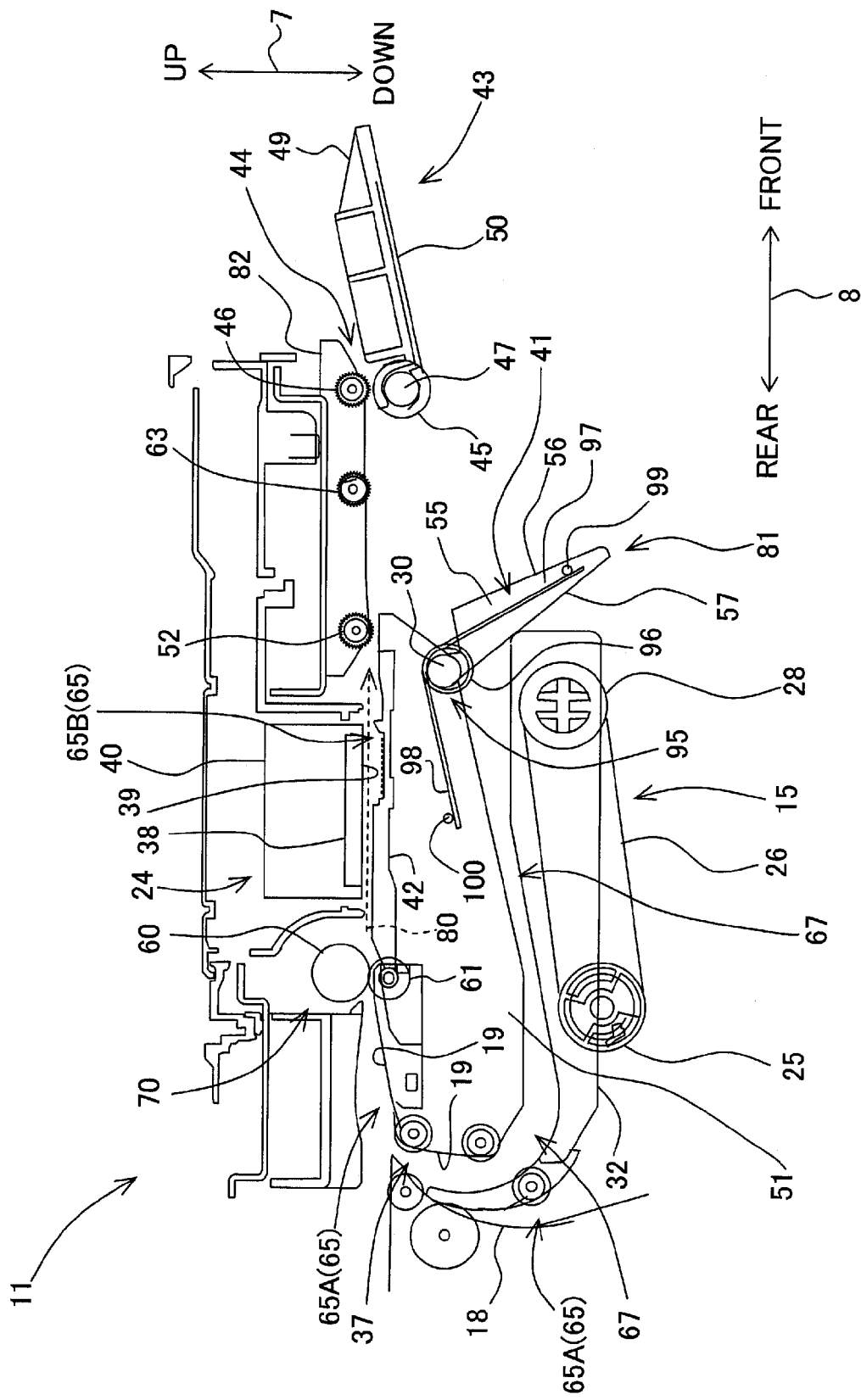
FIG. 9 is still another longitudinal sectional view schematically showing the internal structure of the printer portion 11 in accordance with the modification, wherein the first flap 41 is shown in a state of assuming the ninth position.

In the state shown in FIG. 8, the next aspect is the same as in the aforementioned embodiment: the user of the multifunction printer 10 is able to hold and turn the first flap 41 in the direction of arrow 87, as well as to hold and turn the second flap 43 in the direction of arrow 77. By virtue of this, as shown in FIG. 9, the first flap 41 is revolvable from the tenth position or the first position to the ninth position via the second position.

The above-described embodiment and the modified embodiments are merely examples of the present teaching, and the present teaching is not limited to them. An arbitrary change can be performed without departing from the spirit of the teaching.

What is claimed is:

1. An image recording apparatus which records an image on a sheet, the apparatus comprising:
    a recording portion which is provided in a first transporting path of guiding the sheet in a transporting direction, and which is configured to record the image on the sheet guided through the first transporting path;
    a transporting roller which is disposed at the downstream side from the recording portion in the transporting direction to transport the sheet;
    a first flap which has a first surface and a second surface, the first surface being configured to define a guide surface of the first transporting path between the recording portion and the transporting roller, and the second surface being configured to define a guide surface of a second transporting path which is another transporting path for guiding the sheet and is connected with the first transporting path at a position between the recording portion and the transporting roller and at another position upstream relative to the recording portion in the transporting direction;
    a nip member which is arranged in the first transporting path, and which is configured to nip the sheet between the nip member and the first flap;
    a second flap which has a third surface, which is opposite the second surface of the first flap and which is configured to define a guide surface of the second transporting path;
    an interlock portion which turns the first flap from a second position to a first position when the second flap is changed from a fourth position to a third position;
    a tray which is configured to accommodate the sheet and which is movable to a fifth position at which the sheet is fed to the first transporting path and a sixth position different from the fifth position; and
    a particular support portion which is provided on the tray, the particular support portion is configured to support the second flap to maintain the second flap in the third position when the tray is located in the fifth position,
    wherein the first flap is configured to turn, between the first position and the second position, about a pivot located on the upstream side relative to the position of nipping the sheet between the first flap and the nip member,
    the second flap is configured to change between the third position and the fourth position,
    the first position is a position in which the sheet is guided along the first transporting path by nipping the sheet between the first flap and the nip member,
    the second position is a position in which the first surface is spaced apart from the nip member,
    the third position is a position in which the third surface defines the guide surface of the second transporting path, and the fourth position is a position at which the second transporting path is opened.

2. The image recording apparatus according to claim 1, wherein the interlock portion turns the first flap from the first position to the second position when the second flap is changed from the third position to the fourth position.

3. The image recording apparatus according to claim 2, wherein the interlock portion comprises a further support portion which is configured to change between a seventh position at which the first flap is maintained in the first position and an eighth position at which the first flap is changed from the first position to the second position; and the further support portion comes in contact with the second flap in the third position to maintain the seventh position, and leaves the second flap to change the seventh position to the eighth position as the second flap changes from the third position to the fourth position.

4. The image recording apparatus according to claim 1 further comprising a biasing member which is configured to bias the first flap toward the first position.

5. The image recording apparatus according to claim 1 further comprising a biasing member which is configured to bias, toward the second position, the first flap that has turned from the second position toward a ninth position, wherein the first flap is configured to turn to assume the ninth position spaced apart from the nip member farther than the second position.

6. The image recording apparatus according to claim 1 further comprising a guide member which is provided in the first transporting path and in which the nip member is arranged, wherein the nip member is a spur roller, the guide member has a recess formed on the first transporting path side, and the first flap is configured to be turned to assume a tenth position to block up the first transporting path with a tip portion of the first flap inserted into the recess.

* * * * *